United States Patent [19]

Tanaka et al.

[11] Patent Number: 4,996,415
[45] Date of Patent: Feb. 26, 1991

[54] APPARATUS FOR DETECTING THE PRESENCE AND POSITION OF AN OBJECT

[75] Inventors: Hirokazu Tanaka; Kiyomitsu Ishikawa; Tohru Tanabe, all of Tokyo, Japan

[73] Assignee: Stanley Electric Corporation, Tokyo, Japan

[21] Appl. No.: 247,849

[22] Filed: Sep. 22, 1988

[30] Foreign Application Priority Data

Sep. 22, 1987 [JP] Japan ................. 62-236209

[51] Int. Cl.$^5$ ............................................. G01V 9/04
[52] U.S. Cl. ................................. 250/221; 250/561
[58] Field of Search ............... 250/221, 222.1, 226, 250/561; 340/555, 557; 356/1, 3, 4

[56] References Cited

U.S. PATENT DOCUMENTS

| 3,187,185 | 6/1965 | Milnes | 356/1 |
| 3,393,600 | 7/1968 | Bess | 250/221 |
| 3,576,371 | 4/1971 | Ulicki | 356/4 |
| 3,781,111 | 12/1973 | Fletcher | 356/4 |
| 3,950,098 | 4/1976 | Caine | 356/3 |
| 4,514,083 | 4/1985 | Fukuoka | 356/1 |
| 4,736,097 | 4/1988 | Philipp | 250/221 |
| 4,760,269 | 7/1988 | McKenna | 356/1 |

Primary Examiner—David C. Nelms
Assistant Examiner—Stephone B. Allen
Attorney, Agent, or Firm—Spensley Horn Jubas & Lubitz

[57] ABSTRACT

Here is disclosed a photoelectric detector comprising first and second light sources respectively having different light emitting areas, a photoelectric transducer member adapted to receive the light emitted from these light sources and then reflected on an object to be detected, and a signal processing circuit functioning to separate electric signals corresponding to the first and second light sources from an output of the photoelectric transducer member and to compare these separated two electric signals to each other so that presence or absence and a position of the object are detected on the basis of such comparison of the two electric signals.

7 Claims, 4 Drawing Sheets

APPARATUS FOR DETECTING THE PRESENCE AND POSITION OF AN OBJECT

BACKGROUND OF THE INVENTION

1. Field of the Invention

The present invention relates to a photoelectric detector utilizing the light which is projected to and then reflected on an object to be detected to detect information such as presence or absence of said object or a distance to said object.

2. Background Art

There have already been proposed the photoelectric detectors of various arrangements utilizing the reflected light from the object to be detected, an example of which is illustrated by FIG. 10 of the accompanying drawing.

In accordance with this prior art, light is projected from a light emitting diode 11 to an object 12 to be detected and the light reflected on said object 12 is received by a phototransistor 13.

With this photoelectric detector, it is possible to detect the presence of the object 12 to be detected, so far as said object 12 is within a distance or range of d, and once an output threshold has been preset, it is possible to detect the maximum distance $d_{max}$ to the object 12 by determining when a photoelectric current from said phototransistor 13 is interrupted.

The above-mentioned detector of prior art, however, has encountered a serious problem that the intensity of reflected light depends on the characteristics of individual objects 12 to be detected, for example, the reflection factors and the reflecting surface configurations. Therefore, detection has been inconveniently limited to the particular objects 12 having certain characteristics because a value of the maximum distance $d_{max}$ depends on said characteristics.

Accordingly, such detector of well known art has been certainly effective for detection of a distance with respect to objects of a specific kind (particularly having a same reflection factor), but less reliable for detection of objects of different kinds.

SUMMARY OF THE INVENTION

The invention relates a photoelectric detector utilizing the light reflected on an object to be detected and particularly to such photoelectric detector carried by a vehicle such as an automobile to be effectively used as a back sensor adapted to detect an obstacle as the vehicle is backed.

A principal object of the invention is to provide a photoelectric detector which can reliably detect presence or absence of an object to be detected, a distance to the object, etc., even when the intensity of relected light depends on characteristics of the individual objects to be detected such as the reflection factor and the reflecting surface configuration.

This object is achieved, in accordance with the present invention, by providing a photoelectric detector comprising first and second light sources respectively having different light emitting areas, a photoelectric transducer member adapted to receive the light emitted from these light sources and then reflected on an object to be detected, and a signal processing circuit functioning to separate electric signals corresponding to said first and second light sources from an output of said photoelectric transducer member and to compare these separated two electric signals with each other so that presence or absence and a position of said object are detected on the basis of such comparison of said two electric signals.

With this photoelectric detector, the light projected from the first and second light sources respectively having different light emitting areas to and then reflected on an object to be detected is transduced by the photoelectric transducer member to electric signals which are then separated into the electric signals corresponding to the first and second light sources, respectively, and these separated two electric signals Sa, Sb are compared to each other in the signal processing circuit.

It is determined that said object to be detected is within a predetermined distance or range when the comparison indicates that the one electric signal Sa and the other electric signal Sb are in relationship of $Sa < Sb$, and the maximum distance can be detected when a relationship of $Sa = Sb$ is established. Such feature that two electric signals respectively corresponding to the first and second light sources are compared to each other for detection enables the desired detection to be achieved at a high precision regardless of characteristics of the object to be detected, such as the reflection factor and the reflecting surface configuration.

BRIEF DESCRIPTION OF DRAWING

FIGS. 1, 2 and 3 illustrate a principle of the invention, wherein FIG. 1 illustrates, by way of example, an arrangement utilizing a square diffusing surfaced source of light A and a point source of light B for detection, FIG. 2 illustrates, by way of example, another arrangement utilizing a rectangular diffusing surfaced source of light $A_1$ and a point source of light B for detection and FIG. 3 illustrates a variation in illuminance of said light sources A, $A_1$ and B relative to a distance;

FIGS. 7, 8 and 9 illustrate embodiments of an electric circuit arrangement for execution of the invention, wherein FIG. 7 shows a circuit adapted to activate the first light source and the second light source at different frequencies, FIG. 8 shows a circuit adapted to activate the first light source and the second light source at different wavelengths and FIG. 9 shows a circuit adapted to activate the first light source and the second light source alternately.

DESCRIPTION OF PREFERRED EMBODIMENT

A more detailed understanding of the invention can be had from the following description of exemplary embodiments in reference with the accompanying drawing.

First, a principle of the invention will be discussed particularly in reference with FIGS. 1 through 3.

Generally, illuminance decreases in inverse proportion to a distance from a light source and, in the case of a point source of light, to a square of the distance. However, such square rule will not be followed when the light source has a relatively large surface area for a predetermined distance from the light source and the illuminance decreasing factor with respect to the distance depends on the surface area of the light source.

The present invention utilizes such phenomenon of illuminance variation.

Figure 1:
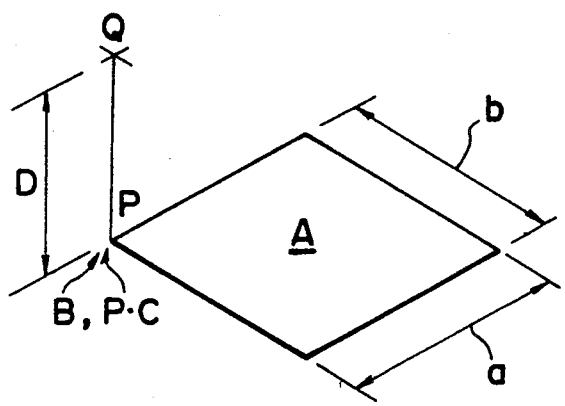

Referring to FIG. 1, A designates a diffusing surfaced light source formed in a square of 100 cm×100 cm. Now a point Q is defined at a vertical distance D cm from a point P corresponding to one corner of said square and a horizontal illuminance E at said point Q is obtained as following, based on the boundary integration theorem:

$$E = \frac{L}{2} \left( \frac{a}{\sqrt{d^2 + a^2}} \cdot \tan^{-1} \frac{b}{\sqrt{d^2 + a^2}} + \frac{b}{\sqrt{d^2 + b^2}} \cdot \tan^{-1} \frac{a}{\sqrt{d^2 + b^2}} \right) \quad (lx)$$

where L represents a brightness of the diffusing surfaced light source A, a represents a length of one side of this light source A, b represents a length of the other side thereof and d=D.

Figure 3:
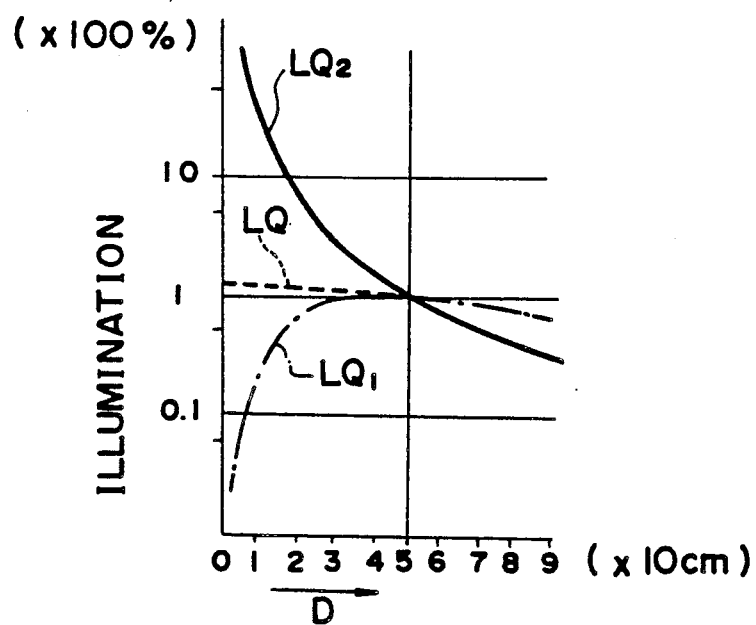

Assumed that an illuminance of the point Q at D=50 cm is 1 (100%) in this calculation formula, the illuminance varies as the distance D varies, as illustrated by LQ in FIG. 3.

Figure 2:
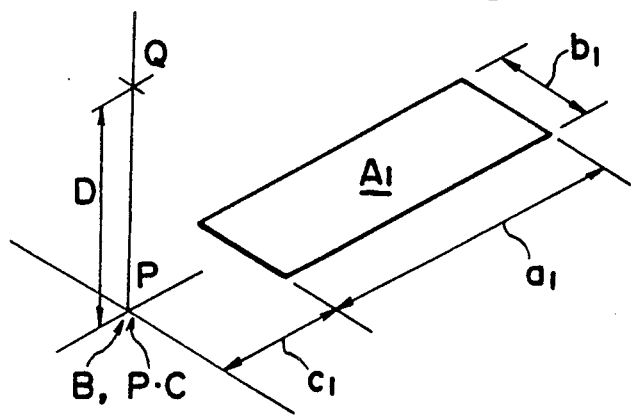

Referring to FIG. 2, $A_1$ designates a diffusing surfaced light source formed in a rectangle having a long side of $a_1 = 50$ cm and a short side of $b_1 = 15$ cm. Now a point P is defined at a longitudinal distance $C_1 = 30$ cm from said light source $A_1$ and a point Q is defined at a vertical distance D cm from said point P. An illuminance of the point Q is calculated by the above-mentioned formula and the result is shown by $LQ_1$ in FIG. 3. Referring to FIGS. 1 and 2, an illuminance of the point Q varies in inverse proportion to a square of the distance as shown by $LQ_2$ in FIG. 3, when a point source of light B is placed on the point P. Assumed, on the other hand, that a light receiving element P·C is placed at the same position as said point source of light B and an object to be detected is present at the point Q, the light emitted from the light sources A, B or $A_1$, B and reflected on said object to be detected is received by the light receiving element P·C and thus said object is detected in accordance with the output of said light receiving element. Specifically, it may be appreciate that the output of the light receiving element P·C is associated with the light sources A, B while the output of said light receiving element P·C is associated with the light sources $A_1$, B, the object to be detected can be determined to lie within D=50 cm if the relationship of Sa<Sb or $Sa_1$<Sb is established. It should be understood here that the output of the light receiving element P·C is previously adjusted by suitable means such as amplifiers so as to take respectively same values (Sa=Sb, $Sa_1$=Sb) at the specified distance (D=50 cm).

In such previous adjustment of the light receiving element output, it is also possible that the light intensity of any one of the light sources A, B, or any one of the light sources $A_1$, B is adjusted.

Although the light source B has been assumed to be the point source of light in the aforegoing description, this light source B may be, instead of being the point source of light, a light source other than the point source of light so far as it is arranged to have a light emitting area different from that of the light source A or $A_1$, since the present invention has a unique arrangement that two electric signals are compared to each other, as has previously been mentioned.

Figure 4:
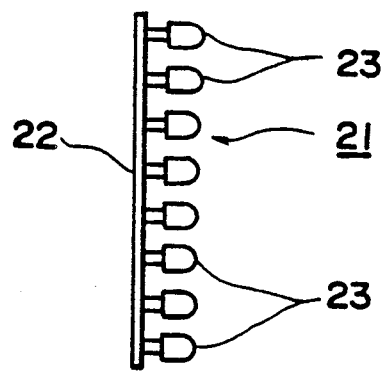
FIG. 4 is a side view showing an embodiment of the diffusing surfaced source of light.
Figure 5:
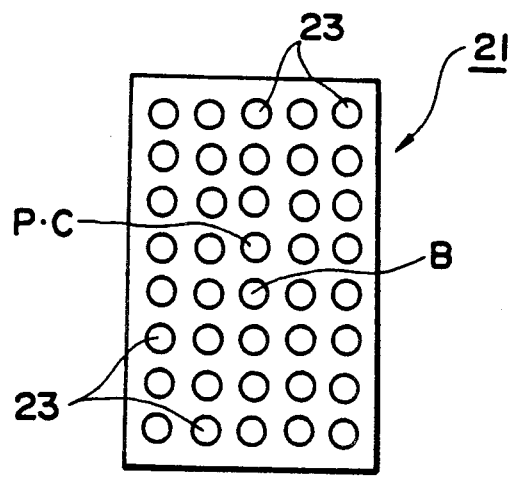
FIG. 5 is a front view of said diffusing surfaced source of light.

FIGS. 4 and 5 illustrate a light source 21 as a specific embodiment of said light source A or $A_1$, comprising a plurality of light emitting diodes 23 arranged in the form of matrix on a circuit substrate 22 so as to provide a light source having a large light emitting area.

Such light source may be also realized by arranging a plurality of electric luminescences (EL) or fluorescences (FL).

When the light source A or $A_1$ is embodied in the form of the light source 21 as shown by FIGS. 4 and 5, an arrangement is also possible in which one of the light emitting diodes 23 is used as the light source B and there is disposed the light receiving element P·C such as a phototransistor adjacent said light emitting diode 23.

Figure 6:
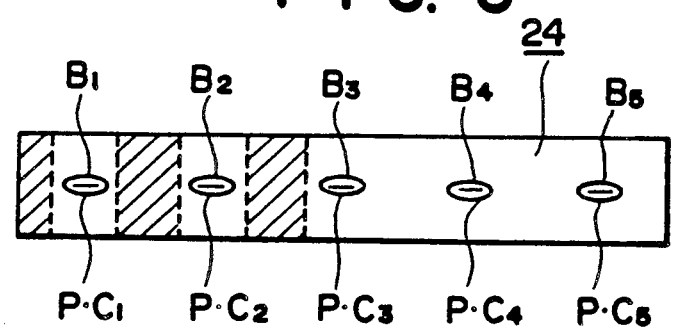
FIG. 6 illustrates another embodiment of the diffusing surfaced source of light comprising the first light source and a combined therewith plurality of second light source/light receiving element sets arranged in array.

FIG. 6 illustrates another embodiment of the present invention, in which the light source A or $A_1$ is formed as an elongate bandlike light source 24 including a plurality of light source B/light receiving element P·C sets ($B_1$, P·$C_1$; $B_2$, P·$C_2$; . . . ) arranged therein at several locations.

With this embodiment, to avoid any interference among the respective light sources B, these light sources $B_1$, $B_2$, $B_3$, . . . are successively energized and the corresponding detections are successively performed by the respective light receiving elements P·$C_1$, P·$C_2$, P·$C_3$, . . . . It should be understood that the light source 24 of FIG. 6 may be also arranged not to be lit over the entire area but to be lit only over respective areas as defined by shading lines as shown.

Figure 7:
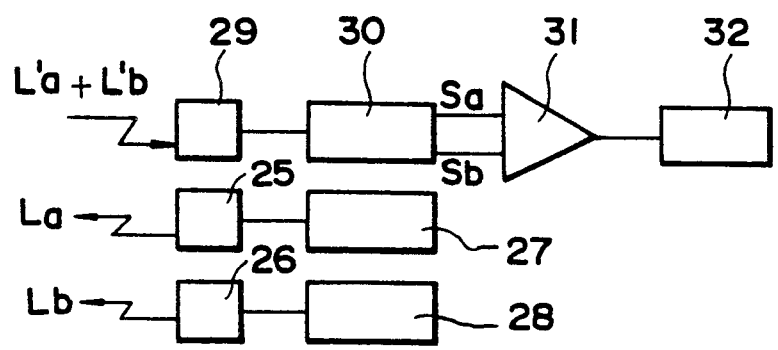
Figure 8:
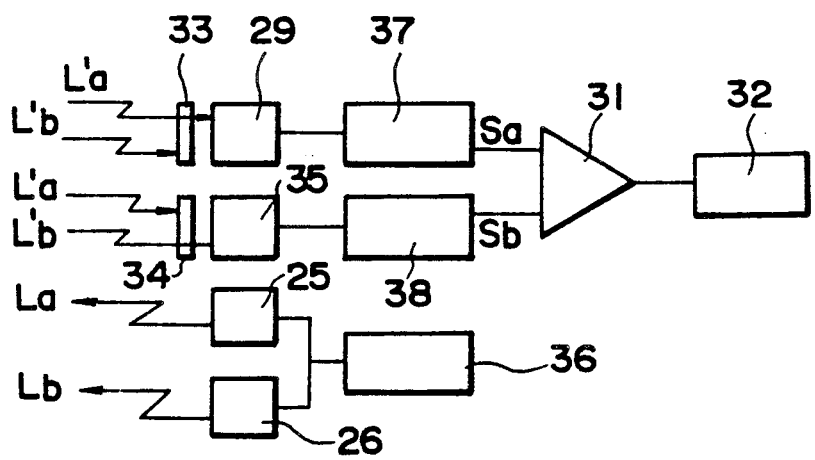
Figure 9:
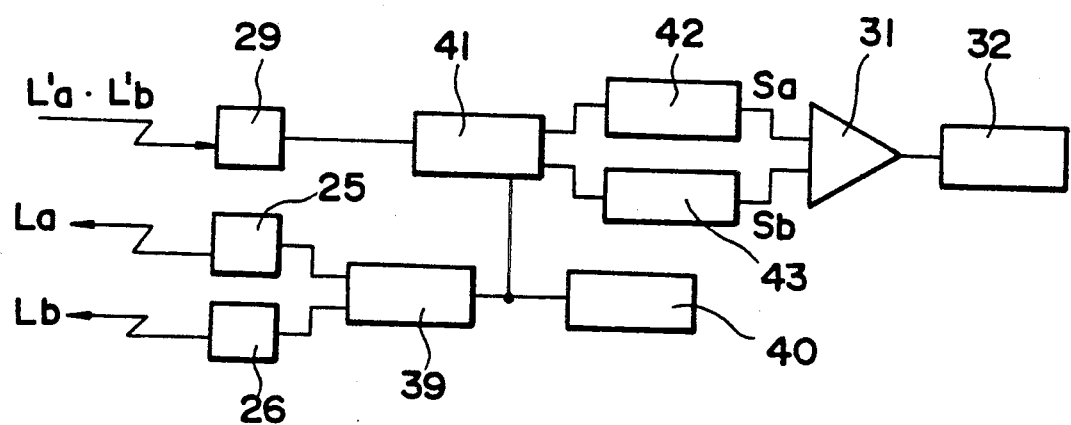
Figure 10:
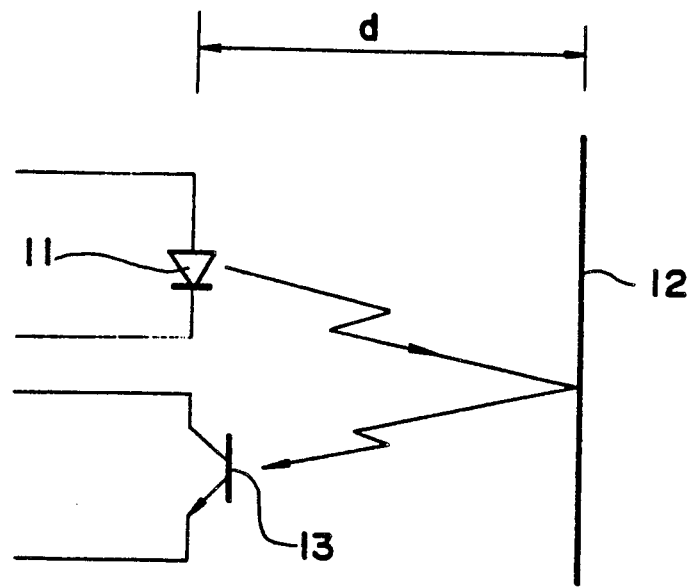
FIG. 10 is a schematic circuit diagram illustrating the conventional photoelectric detector.

FIGS. 7 through 9 are block diagrams illustrating various embodiments of a circuit arrangement adapted to process electric signals, in which the similar circuit sections or members are designated by the similar reference numerals.

Referring to FIG. 7, reference numeral 25 designates a first light source corresponding to the light source A or $A_1$, 26 a second light source corresponding to the light source B and 27, 28 power supply circuits respectively functioning to energize said light sources 25, 26 at different frequencies. Light rays La, Lb projected from the respective light sources 25, 26 are reflected on an object to be detected, and the reflected light rays L'a, L'b are received by a light receiving element 29.

Output signal from the light receiving element 29 is subjected to frequency separation and amplification, then output as electric signals Sa, Sb.

These two electric signals Sa, Sb are compared to each other in a comparator 31 and a result of comparison is sent to a display 32.

The display 32 may be of visual type or acoustic type.

If the object to be detected or the detector is moving, there may be provided an arrangement such that the output of the comparator 31 is utilized to stop this movement.

FIG. 8 illustrates an embodiment in which the wavelength of the light emitted from the first light source 25 is different from the wavelength of the light emitted from the second light source 26, for example, the first light source 25 is a light emitting diode adapted to emit red light La and the second light source 26 is a light emitting diode adapted to emit infrared light Lb. Additionally, there are provided a filter 33 adapted to transmit only the red light and a filter 34 adapted to transmit only the infrared light in front of the respective light receiving elements 29 and 35. A block 36 represents a power supply circuit to drive the light sources 25, 26 so that the red light La and the infrared light Lb may be modulated so as to be distinguished from the natural light. Such modulator means is preferably provided also in the previously mentioned embodiment in reference with FIG. 7 as well as in the embodiment as will be described later in reference with FIG. 9.

In this manner, the red light L'a reflected on the object to be detected is received by the light receiving element 29 while the infrared light L'b similarly reflected on said object is received by the light receiving element 35, and the outputs of these light receiving elements are applied through amplifiers 37, 38 to the comparator 31 as the corresponding electric signals Sa, Sb. Then, a result of comparison is displayed by the display 32 as in the previously mentioned embodiment.

FIG. 9 illustrates an embodiment in which the first and second light sources 25, 26 are alternately energized by a distributor 39, and correspondingly the light receiving element 29 alternately receives the reflected light rays L'a, L'b coming from the object to be detected.

A block 40 represents a clock pulse generator to supply clock pulses to the distributor 39 and a signal separator 41. The signal separator 41 is responsive to input of the clock pulse to separate the signal applied from the light receiving element 29. Two signal series obtained by such separation are, after integrated, applied through circuits 42, 43 functioning to amplify the signals to a predetermined level to the comparator 31 as the electric signals Sa, Sb and a result of comparison is displayed by the display 32 as in the previously mentioned embodiments.

Although the present invention has been described with reference to specific embodiments, the present invention is not limited to these specific embodiments. For example, when the present invention is practically adopted as a back sensor for automobile, the light source having a large light emitting area may be utilized as the tail light to detect any obstacle as an object to be detected during backing of the automobile.

What is claimed is:

1. A photoelectric detector comprising first and second light sources having, respectively, different light emitting areas, and disposed to illuminate a common region of an object to be detected, photoelectric transducer means adapted to receive the light emitted from said first and second light sources and then reflected by the object, and a signal processing circuit functioning to separately process electric signals corresponding to said first and second light sources from an output of said photoelectric transducer means and to compare these two separately processed electric signals to each other so that presence or absence, and a position, of the object are detected on the basis of such comparison of said two electric signals, wherein each electric signal has a value representative of the intensity, at said transducer means, of light emitted by a respective light source and reflected by the object, and said signal processing circuit compares the intensity-representing values of the two signals.

2. A photoelectric detector as recited in claim (1), wherein said first and second light sources respectively comprise light emitting diodes and said photoelectric transducer means comprises a light receiving element such as phototransistor.

3. A photoelectric detector as recited in claim (1), wherein said first and second light sources are adapted to emit light at different light wavelengths, respectively.

4. A photoelectric detector as recited in claim (1), wherein the light emitted from said first light source and the light emitted from said second light source are modulated at different frequencies.

5. A photoelectric detector as recited in claim (1), wherein light emission of said first light source and said second light source is alternately driven.

6. A photoelectric detector as recited in claim (1), wherein said first light source comprises an elongate band-like light source and a plurality of second light source/light receiving element sets are incorporated in said band-like first light source at several locations thereof.

7. A photoelectric detector as recited in claim (2), wherein a plurality of light emitting diodes are arranged in the form of matrix on a circuit substrate with one of these light emitting diodes serving as the second light sources and the other light emitting diodes serving as the first light source, and the light receiving element is disposed together with said light emitting diodes on said circuit substrate.

* * * * *